Patented June 19, 1951

UNITED STATES PATENT OFFICE 2,557,625

POLYMERIC TRI-β-HYDROXYETHYL CYANURATE

Pierrepont Adams, Glenbrook, Conn., assignor to American Cyanamid Company, New York, N. Y., a corporation of Maine No Drawing. Application January 10, 1947, Serial No. 721,464

4 Claims. (Cl. 260—2)

This invention relates to a new and improved method of preparing a resinous composition, and more particularly to the method of preparing a resinous composition which comprises heating tri-β-hydroxyethyl cyanurate at a temperature between 105° C. and 150° C. to form a resinous condensation product thereof. Specifically, the invention is concerned with the preparation of a resinous composition by heating tri-β-hydroxyethyl cyanurate while admixed with a condensation catalyst within the aforementioned temperature range until a resinous condensation product of the said cyanurate has been obtained. Examples of condensation catalysts that can be used are sodium hydroxide and phosphoric acid.

It was known prior to my invention that trimethyl cyanurate could be transesterified with a monohydric alcohol. Thus, Hofmann [Ber. 19, 2061–2083 (1886)] observed that if trimethyl cyanurate be refluxed with an equivalent amount of sodium ethoxide in ethanol, it is completely transformed to the triethyl ester. However, to the best of my knowledge and belief it was not known that resinous compositions could be prepared from tri-β-hydroxyethyl cyanurate as briefly described in the first paragraph of this specification and more fully hereinafter.

In order that those skilled in the art better may understand how the present invention may be carried into effect, the following examples are given by way of illustration and not by way of limitation. All parts are by weight unless otherwise stated.

EXAMPLE 1

*Preparation of tri-β-hydroxyethyl cyanurate*

To 450 parts of ethylene glycol there was added about 9.5 parts of methanol, in which 0.5 part of sodium metal had been dissolved, and 102.6 parts of trimethyl cyanurate. The reaction mixture was heated by means of an oil bath maintained at 100°–110° C. for two hours under a pressure of 65–85 mm. At the end of this time 62 parts of methanol had distilled from the reaction mass. To the reaction mass there was added 8.75 parts by volume of 10% hydrochloric acid to neutralize the catalyst, and the excess glycol (285 parts) was distilled at 60° C. at 1–2 mm. pressure. The viscous residue was dissolved in a small quantity of dioxane, and crude tri-β-hydroxyethyl cyanurate crystallized from this solution upon cooling. After recrystallization from hot dioxane, the yield of product was 74 parts, that is, 47% of the theoretical amount of tri-β-hydroxyethyl cyanurate, and the yield was increased to 69% of the theoretical by working up the filtrates. A sample which was recrystallized several times from hot dioxane melted at 130°–132° C., and showed the following analysis:

|  | Per Cent C | Per Cent H | Per Cent N |
|---|---|---|---|
| Calculated for $C_9H_{15}N_3O_6$ | 41.38 | 5.75 | 16.09 |
| Found | 41.40 | 5.95 | 16.02 |
|  | 41.40 | 5.76 | 16.21 |

Trimethyl cyanurate is prepared, for example, by adding 307 parts of cyanuric chloride to an agitated mixture of 503 parts of anhydrous sodium carbonate and about 1980 parts of methyl alcohol. The addition requires about ½ hour, and the temperature of the reaction mixture is maintained at 25° to 35° C. during this time by means of an ice bath. The mixture is stirred for 5 hours and allowed to stand for about 16 hours. The reaction mass is filtered after it has been heated to boiling, and the resulting salt cake is washed with methanol. The methanol is distilled from the solution and the crude product comprising trimethyl cyanurate is crystallized from a 15% aqueous solution of ethylene glycol monoethyl ether. A second crop of crystals is obtained by concentrating the mother liquor to a volume of 600 parts. The total yield of trimethyl cyanurate, melting at 134°–134.5° C., is 98% of the theoretical.

EXAMPLE 2

A sample of tri-β-hydroxethyl cyanurate was heated in a 105° C. oven for about 65 hours. A hard, water-insoluble resinous material was formed.

EXAMPLE 3

Six samples each of which comprised 5 parts by volume of a 20% aqueous solution of tri-β-hydroxyethyl cyanurate were prepared. To each of four samples was added 1 part by volume of a 1% solution of (a) sodium carbonate, (b) sodium hydroxide, (c) phosphoric acid and (d) sulfuric acid as condensation catalysts. No catalysts were added to the other two samples. All samples were heated as shown below:

| Sample No. | Temp., °C. | Catalyst |
|---|---|---|
| 1 | 105 | None. |
| 2 | 125 | None. |
| 3 | 125 | Sodium carbonate. |
| 4 | 125 | Sodium hydroxide. |
| 5 | 125 | Phosphoric acid. |
| 6 | 125 | Sulfuric acid. |

After heating for 19 hours Sample No. 1 was an opaque solid. The others formed clear solids. Sample No. 5 was slightly yellow in color, while No. 6 was brown. All were hard and brittle resins.

The procedure was repeated but in this case the samples were dried for 30 minutes at 105° C. and then were heated at 150° C. Only one sample containing no catalyst was prepared. After 19 hours' heating at 150° C. the sample containing no catalyst and the one containing the phosphoric acid catalyst were slightly yellow in color, while the sample containing the sulfuric acid was brown. All samples formed hard and brittle resinous condensation products.

EXAMPLE 4

A mixture of 100 parts of tri-β-hydroxyethyl cyanurate, 100 parts of water and 5 parts of sodium carbonate was warmed on a steam bath until a solution was obtained which remained clear on cooling. Alpha-cellulose paper was dipped in this solution to impregnate the paper, and then was hung up to air dry. The dried paper was cut into six 6-inch x 6-inch sheets. A hard, rigid laminated article was produced by heating the superimposed sheets for 30 minutes at 145°–160° C. under a pressure of 5000 pounds per square inch.

EXAMPLE 5

|  | Parts | Approx. Molar Ratio |
|---|---|---|
| Trimethyl cyanurate | 342 | 1.0 |
| Ethylene glycol | 186 | 1.5 |
| Sodium (dissolved in about 63.4 part of methanol) | 4 | |

The mixture of the above ingredients was heated under the vacuum produced by a water pump in a reaction vessel placed in a 100°–110° C. oil bath. After heating for 30 minutes the resulting transesterification product, which amounted to 425 parts, was insoluble in water, alcohol and other organic solvents.

Substantially the same results were obtained when only half as much metallic sodium dissolved in about 31.7 parts of methanol was used as a catalyst for the reaction.

EXAMPLE 6

|  | Parts | Approx. Molar Ratio |
|---|---|---|
| Trimethyl cyanurate | 342 | 1 |
| Ethylene glycol | 372 | 3 |
| Sodium (dissolved in about 31.7 parts of methanol) | 2 | |

The same procedure was followed as described under Example 5 with the exception that the reaction mass was heated in a 105° C. oil bath. The resulting transesterification product was water-soluble. The yield amounted to 585 parts.

When a 21% aqueous solution of this transesterification product was heated for 30 minutes at 150° C. it yielded a resinous film which was insoluble in cold water but was softened by the water.

EXAMPLE 7

Same formula as in Example 5 with the exception that 2 parts of sodium dissolved in about 31.7 parts of methanol was used. The mixture was heated and stirred in a vessel placed in a 100° C. oil bath for 10 minutes to yield a clear solution. It was then distilled at approximately the same temperature for 5 minutes under the vacuum of a water pump, yielding 500 parts of a water-soluble transesterification product. Upon continuing the distillation for another 5 minutes, the yield of product amounted to 740 parts. The product was hydrophobic in a large excess of water.

EXAMPLE 8

|  | Parts | Approx. Molar Ratio |
|---|---|---|
| Trimethyl cyanurate | 342 | 1 |
| Ethylene glycol | 248 | 2 |
| Sodium (dissolved in about 31.7 parts of methanol) | 2 | |

Essentially the same procedure was followed as described under Example 6. After distilling for 10 minutes a water-soluble transesterification product amounting to 535 parts was obtained. When distillation was continued for another 5 minutes the yield of the product was 520 parts, and it was hydrophobic in a large excess of water.

EXAMPLE 9

|  | Parts | Approx. Molar Ratio |
|---|---|---|
| Trimethyl cyanurate | 342 | 1.0 |
| Ethylene glycol | 310 | 2.5 |
| Sodium (dissolved in about 31.7 parts of methanol) | 2 | |

The procedure followed was essentially the same as that described under Example 6. A water-soluble transesterification product in a yield amounting to 575 parts was obtained after 15 minutes' distillation. After distilling for an additional 15 minutes, 545 parts of product was obtained. It was hydrophobic in a large excess of water.

EXAMPLE 10

|  | Parts | Approx. Molar Ratio |
|---|---|---|
| Trimethyl cyanurate | 120.0 | 1 |
| Ethylene glycol | 130.0 | 3 |
| Sodium (dissolved in about 11 parts of methanol) | 0.7 | |

The mixture of the above ingredients was heated and stirred in a vessel placed in a 100° C. oil bath for 30 minutes, yielding a clear solution. The reaction mass was then heated at the same temperature under the vacuum produced by a water pump. After 45 minutes of vacuum distillation the yield of transesterification product amounted to 210 parts. After distilling for an additional 15 minutes, the yield of product was 205.5 parts. It was hydrophobic in a large excess of water.

EXAMPLE 11

Cotton percale was immersed in a bath consisting of a 10% aqueous solution of tri-β-hydroxyethyl cyanurate and 0.5% sodium carbonate as a curing catalyst. The treated cloth was then heated for 30 minutes at 350° F. to dry it and to form a resinous condensation product of the tri-β-hydroxyethyl cyanurate in situ. The dried cloth contained 7% by weight thereof of resin solids. The resin-coated and -impregnated cloth was washed for 1 hour at 160° F. using an aqueous solution containing ¼% each of soap and soda ash, after which it was rinsed in clear water at 160° F. The washed and dried cloth contained about 4.8% of resin solids, based on the weight of the untreated cloth.

Similar results were obtained when the transesterification product of Example 10 was applied to cotton percale. In this case, however, the dried cloth contained 18.4% by weight thereof of resin solids and, after washing as above described, about 12.3%.

EXAMPLE 12

Rayon challis was immersed in a bath consisting of a 15% aqueous solution of the transesterification product of Example 10 and 0.75% sodium carbonate as a curing catalyst. After heating for 30 minutes at 350° F. the treated rayon showed better abrasion resistance than the untreated rayon.

The resinous and other synthetic materials of this invention may be employed as modifiers, more particularly as plasticizers, of other synthetic resins, in order to impart toughness or improved plasticity and postformability to resins which otherwise are excessively brittle or have poor plasticity. They may be co-reacted with various aldehyde-reaction products, for instance, partial reaction products of an aldehyde, e. g., formaldehyde, and phenol or a substituted phenol, urea or a substituted urea, melamine or other aminotriazine, etc. They also may be incorporated into alkyd resins. For example, the reaction between the polyhydric alcohol and the cyanuric triester may be effected in the presence of an excess of the former, and the unreacted polyhydric alcohol then may be esterified with phthalic anhydride, maleic anhydride, fumaric acid or other polycarboxylic acid or anhydride in the presence of the transesterification product thereby to obtain a modified alkyd resin. Or, alternatively, the cyanuric triester may be re-esterified using monoglycerides of mono or dibasic acids, e. g., linoleic diglyceride, phthalic diglyceride, etc.

The resinous or potentially resinous materials resulting from the method of this invention also may be employed in various textile-treating compositions for imparting texture and "hand" to the treated textile, as well as for casting, molding, coating, and electrically insulating purposes or as components of compositions used for such purposes. These synthetic materials may be used alone or admixed with various fillers, pigments, dyes or other modifying agents, e. g., phenol-aldehyde resins, urea-aldehyde resins, melamine-aldehyde resins, alkyd resins, cellulose esters, cellulose ethers, hydrocarbon-substituted polysiloxane resins, etc. The soluble materials may be dissolved in naphtha, xylene, benzene, toluene, butanol, methyl ethyl ketone, amyl acetate, etc., to form coating and impregnating compositions of any desired viscosity. Such compositions may have incorporated therein linseed oil, tung oil, soya bean oil or acids thereof, or other drying or semi-drying oils or acids, as well as driers, more particularly metallic driers, e. g., cobalt naphthenate, manganese naphthenate, cobalt resinate, etc., to improve the adhesive and drying characteristics of the composition.

In the copending application of Edward L. Kropa, Serial No. 721,488, filed concurrently herewith, are disclosed and claimed compositions comprising a synthetic material obtained by effecting reaction between ingredients including (1) a cyanuric triester of a primary, ethylenically unsaturated monohydric alcohol containing at least 3 and not more than 10 carbon atoms and (2) a polyhydric alcohol in which the hydroxy groups are members of the class consisting of primary and secondary hydroxy groups, and methods of preparing such compositions.

I claim:

1. The method of preparing a resinous composition which comprises heating tri-β-hydroxyethyl cyanurate at a temperature between 105° C. and 150° C. to form a resinous condensation product thereof.

2. The method of preparing a resinous composition which comprises heating tri-β-hydroxyethyl cyanurate admixed with a condensation catalyst therefor at a temperature between 105° C. and 150° C. until a resinous condensation product of tri-β-hydroxyethyl cyanurate has been obtained.

3. A method as in claim 2 wherein the condensation catalyst is sodium hydroxide.

4. A method as in claim 2 wherein the condensation catalyst is phosphoric acid.

PIERREPONT ADAMS.

REFERENCES CITED

The following references are of record in the file of this patent:

UNITED STATES PATENTS

| Number | Name | Date |
| --- | --- | --- |
| 2,275,467 | Pollack et al. | Mar. 10, 1942 |
| 2,296,823 | Pollack et al. | Sept. 22, 1942 |
| 2,306,440 | Hentrich et al. | Dec. 29, 1942 |
| 2,381,121 | Ericks | Aug. 7, 1945 |
| 2,481,156 | Schaefer | Sept. 6, 1949 |
| 2,496,097 | Kropa | Jan. 31, 1950 |

Certificate of Correction

Patent No. 2,557,625                                           June 19, 1951

PIERREPONT ADAMS

It is hereby certified that error appears in the printed specification of the above numbered patent requiring correction as follows:

Column 2, line 42, for "carbonate,," read *carbonate,*; column 3, Example 5, column 1 thereof, line 3, for "part" read *parts*; column 4, line 2, for "740" read *470*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*